Patented Nov. 9, 1948

2,453,109

UNITED STATES PATENT OFFICE 2,453,109

METHOD OF PREPARING FULL-FLAVORED FRUIT JUICE CONCENTRATES

Louis G. MacDowell, Lakeland, and Edwin L. Moore and Cedric D. Atkins, Winter Haven, Fla., assignors to the United States of America as represented by the Secretary of Agriculture No Drawing. Application August 7, 1945, Serial No. 609,473

5 Claims. (Cl. 99—205)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

This invention relates to a process for preparing fruit juice concentrates of superior flavor and is particularly directed to citrus juice concentrates.

Fruit juice concentrates are usually prepared from fruit juices by evaporating water therefrom at atmospheric pressure or under vacuum. In addition, various fruit juice concentrates have been prepared by freezing and removing the water as ice from the concentrated juice.

It is well known that the delicate flavors of most fruit juices are easily injured by heat, especially in the presence of oxygen. It is also true, with most fruit juices, that the more they are concentrated, the less they resemble the natural product even when diluted with water to original strength. This is due in a large part to the fact that a major portion of the aroma of fruit juices consists of volatile flavoring compounds which are readily destroyed or volatilized by heat, even in vacuo. Thus, in the usual process of concentrating fruit juices by evaporation, most of these volatile flavoring compounds, generally referred to as "volatile esters," are lost.

Various attempts have been made to recover these so-called "volatile esters," and finally return them to the finished concentrate. In some cases, the recovery of the volatile esters may be accomplished by installing between the evaporator and the source of reduced pressure a very low temperature condenser, often referred to as an "ester trap." It is possible to improve the flavor of apple and grape juice concentrates by the reincorporation of the flavoring compounds; but in the case of other fruit juices, particularly citrus juices, the results have been unsatisfactory.

The principal object of this invention is to prepare a concentrated fruit juice containing a substantial portion of the original aroma, flavor, and palatability. This may be accomplished by adding a portion of fresh, single-strength juice to a relatively strong concentrate (however prepared) and thereby obtaining a concentrate of medium strength. The fresh juice returns much of the natural aroma, flavor, and palatability to the concentrate. We have found that when concentrates prepared in this manner were diluted to original concentration with water, the resulting product is superior in aroma, flavor, and palatability to similar products prepared from conventional vacuum concentrates, and is hardly distinguishable from fresh juice.

In order to assure ample fresh flavor in the case of orange juice, for example, the amount of fresh single-strength juice, either pasteurized or unpasteurized, added should preferably constitute at least 6 percent of the total amount of single-strength juice used in preparing the finished concentrate. Amounts in excess of 25 percent are usually unnecessary. As a preferred method of operation, the fresh single-strength orange juice added either should be deaerated, or the resulting mixture should be deaerated. When pasteurized fresh single-strength orange juice is added, the orange juice should be deaerated before pasteurization.

When these orange juice concentrates are held in freezing storage, oxidation appears to be the principal cause of their deterioration; and it can be almost completely eliminated by deaeration of the fresh orange juice or finished concentrate, and packing of the concentrate under vacuum or inert gas.

The degree of concentration of the strong and medium concentrates depends on the use to be made of the final product and the equipment on hand. At present, most vacuum concentrators of citrus juices are designed to produce a product containing about 65 percent soluble solids. This represents approximately a seven and one-half fold concentration. At times eight- or higher-fold concentrates are made. Three- or four-fold concentrates offer advantages in that, if they are frozen, dilution with two or three volumes, respectively, of tap water is sufficient to melt the ice and result in a cool refreshing drink. Only a few seconds are required in the preparation of these drinks; whereas, higher-fold concentrates reconstitute more slowly.

The original juice used in concentrating may or may not be pasteurized. Both give satisfactory results, but special precautions must be taken to keep the count of microorganisms low if the juice is not pasteurized. Also the juice used in diluting the concentrate may or may not be pasteurized. The degree of concentration may be varied to a considerable extent and also the degree of dilution with fresh juice.

The final concentrate may be frozen quickly and stored in a frozen condition. A maximum storage temperature of 5° F. is recommended for the frozen product. Unfrozen concentrates may be stored at 35° F. or even at room temperature, but in these cases it is preferred that the product be pasteurized and sealed in a hermetic container. Pasteurizing may be accomplished by the flash method.

It is to be understood that "fresh" juice as referred to herein means fresh fruit juice that is either unpasteurized or pasteurized.

The following examples will serve to illustrate the practice of the invention:

Example 1

Valencia oranges were washed, allowed to dry, and halved. The juice was extracted on a revolving burr and screened of suspended pulp. Four gallons of this juice (12° Brix) were concentrated under vacuum at a temperature of about 40° F. to a Brix of 65° (about 7-fold). Fresh deaerated single-strength juice was added to the concentrate until a Brix of 42° (about 4-fold) was obtained. The product was then sealed under vacuum and placed in cold storage and frozen storage.

Example 2

Tangerines were washed, allowed to dry, and the juice extracted on a commercial juice extractor. Six and one-half gallons of the juice (11.5° Brix) were deaerated, pasteurized, cooled, and concentrated under vacuum at a temperature of about 80° F. to 61° Brix (about 6½-fold). Sufficient deaerated, pasteurized, and cooled single-strength tangerine juice was added to yield a Brix of about 43° (about 4-fold) and the product sealed under vacuum and placed in frozen storage.

Although orange juice and tangerine juice have been used as examples to illustrate this invention, it is to be understood that the invention is not limited to orange juice concentrate, or tangerine juice concentrate, or even citrus juice concentrates generally, but may be used for other fruit juices. Modifications of the invention other than those disclosed will be readily apparent to those skilled in the art and are intended to be included within the invention as defined by the appended claims.

Having thus described our invention, we claim:

1. A process of producing a citrus fruit juice concentrate capable of speedy reconstitution by addition of water to make a cold drink having a substantial portion of the original aroma, flavor and palatability of the citrus fruit, comprising concentrating whole juice of citrus fruit under vacuum to about five- to eight-fold, then diluting the concentrated juice with fresh, unconcentrated, deaerated whole juice of the same citrus fruit to lower the concentration to about three- to four-fold, sealing, and freezing.

2. The process of claim 1 in which the concentrating is at no higher than about 80° F.

3. The process of claim 1 in which the fruit is orange.

4. The process of claim 1 in which the fruit is orange and the temperature of concentration is no higher than 80° F.

5. A process of producing a citrus fruit juice concentrate capable of speedy reconstitution by addition of water to make a cold drink having a substantial portion of the original aroma, flavor, and palatability of the citrus fruit, comprising concentrating whole juice of citrus fruit under vacuum to about five- to eight-fold, then diluting the concentrated juice with fresh, unconcentrated whole juice of the same citrus fruit to lower the concentration to about three- to four-fold, deaerating where air has entered the mixture, sealing the mixture under vacuum, and freezing.

LOUIS G. MacDOWELL.
EDWIN L. MOORE.
CEDRIC D. ATKINS.

REFERENCES CITED

The following references are of record in the file of this patent:

UNITED STATES PATENTS

| Number | Name | Date |
|---|---|---|
| 228,889 | Gue et al. | June 15, 1880 |
| 950,950 | Oheme | Mar. 1, 1910 |
| 1,189,127 | Kellogg | June 27, 1916 |
| 1,497,043 | Taylor | June 10, 1924 |
| 1,717,489 | Barlow | June 18, 1929 |
| 2,071,011 | Wendt | Feb. 16, 1937 |
| 2,338,608 | Weisberg | Jan. 4, 1944 |
| 2,282,622 | Torrence | May 12, 1942 |